April 29, 1924.
S. H. CROCKER
1,491,946
APPARATUS FOR THE PRODUCTION OF CINEMATOGRAPH PICTURES
Filed June 22, 1922
3 Sheets-Sheet 1
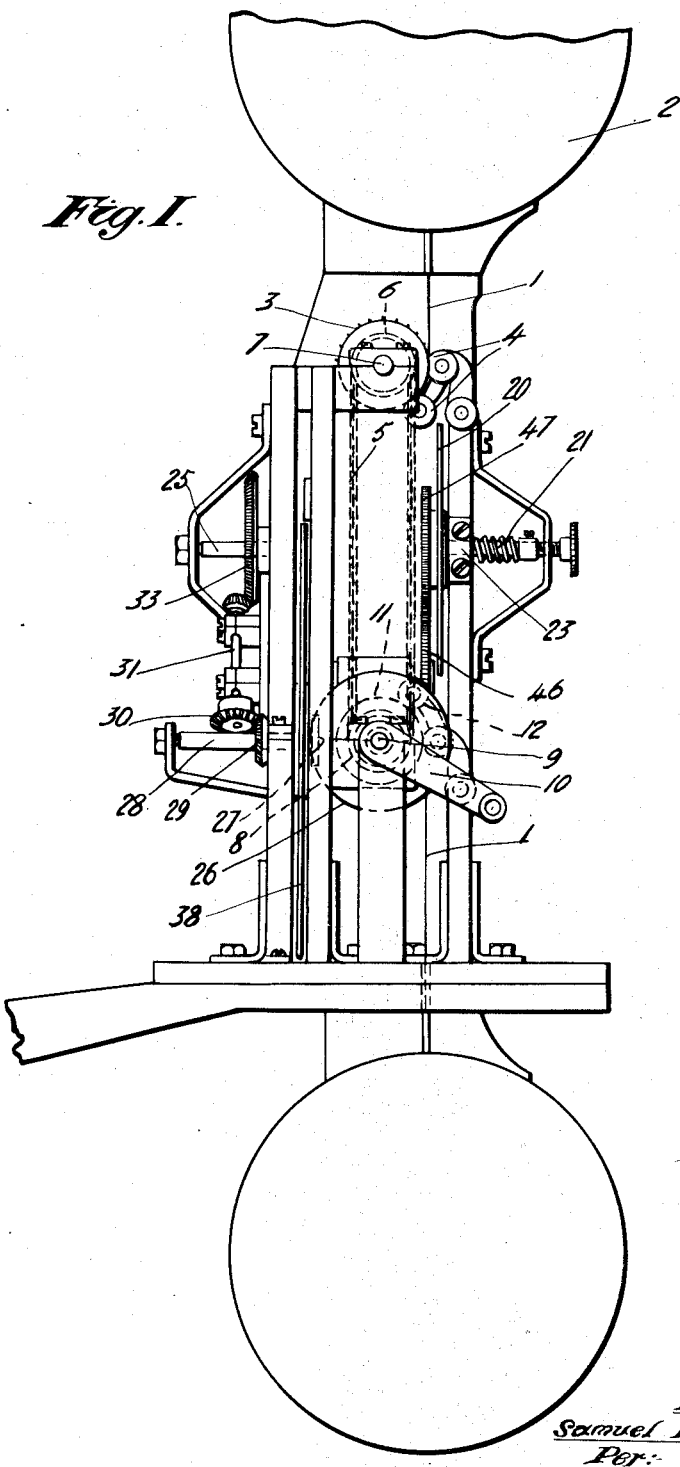
Fig. I.
Inventor.
Samuel Henry Crocker
Per:-
Attorneys.

April 29, 1924.
S. H. CROCKER
1,491,946
APPARATUS FOR THE PRODUCTION OF CINEMATOGRAPH PICTURES
Filed June 22, 1922     3 Sheets-Sheet 2
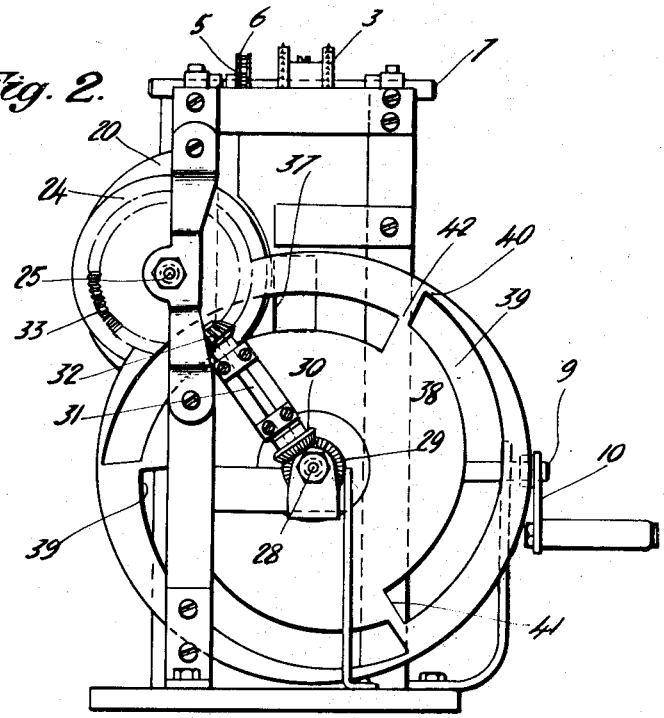
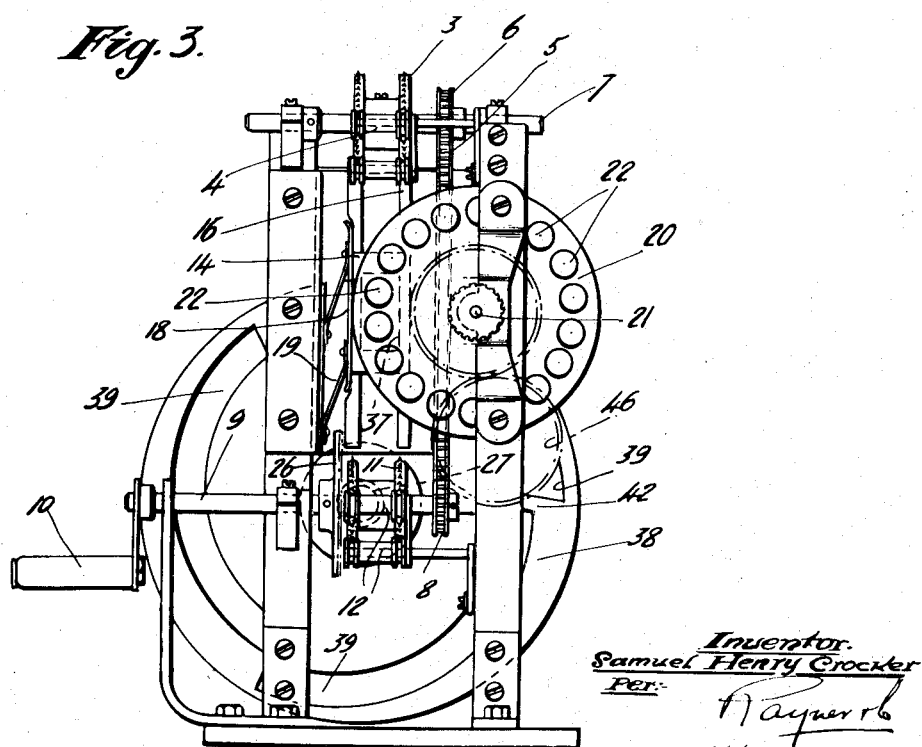
Inventor.
Samuel Henry Crocker
Per:-
Attorneys.

April 29, 1924.
S. H. CROCKER
APPARATUS FOR THE PRODUCTION OF CINEMATOGRAPH PICTURES
Filed June 22, 1922  3 Sheets-Sheet 3
1,491,946
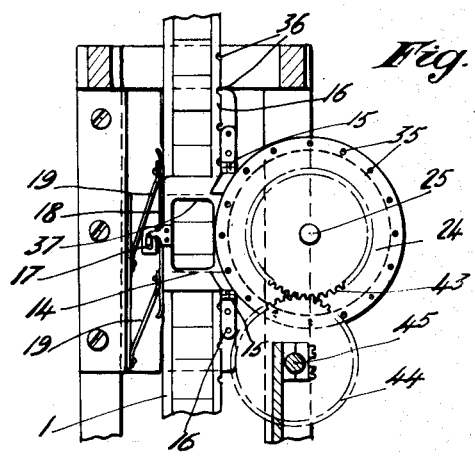
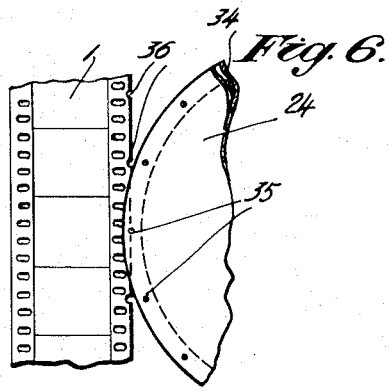
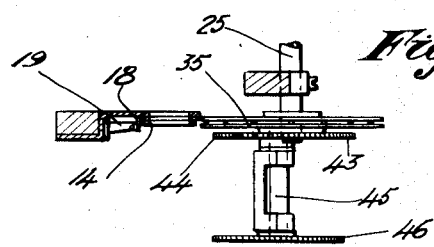
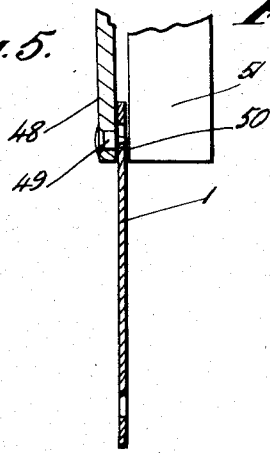
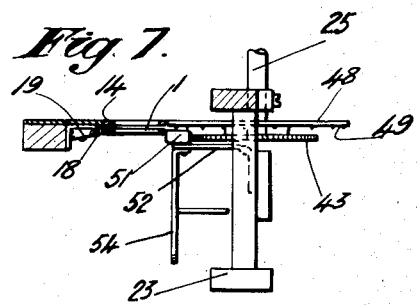
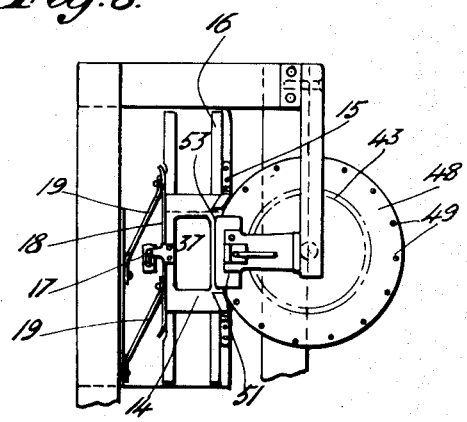
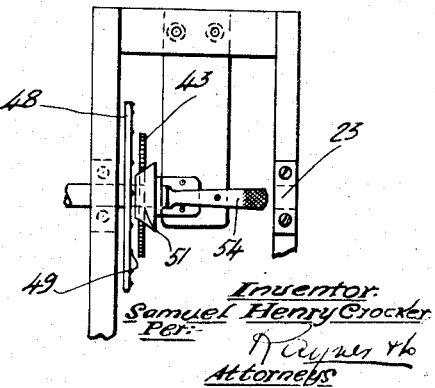
Inventor:
Samuel Henry Crocker
Per:-
Attorneys Patented Apr. 29, 1924.

1,491,946

UNITED STATES PATENT OFFICE.

SAMUEL HENRY CROCKER, OF LONDON, ENGLAND.

APPARATUS FOR THE PRODUCTION OF CINEMATOGRAPH PICTURES.

Application filed June 22, 1922. Serial No. 570,195.

*To all whom it may concern:*

Be it known that I, SAMUEL HENRY CROCKER, subject of the King of Great Britain and Ireland, and residing at London, England, have invented a new and useful Apparatus for the Production of Cinematograph Pictures, of which the following is a specification.

My invention relates to kinematographic pictures of the continuously moving film type and to apparatus for the production of such pictures including a continuously moving film and a rotary-optical system in which the optical elements are arranged in the form of a ring or rings.

Hitherto kinematographic pictures produced by rotary-optical systems and continuously moving films have been associated with certain sliding effects due to the dissimilarity of the actions of the optical and mechanical systems used to produce them.

Now it is a purpose of this invention to provide and present pictures of the continuously moving film type without the said sliding effects and viewable without the usual eye-strain. A further purpose of the invention is the provision of means for the production of such pictures through similarity in optical and mechanical actions.

The practical application of the principle of similarity of action involved in the constructional part of the invention is represented by the use of a rotary member in suitable and direct or indirect connection with a kinematographic film and adapted to rotate continuously at a speed similar to that of the optical system and continuously move the film at a speed similar to that of the optically effective movement of the said optical system.

According to this invention I employ a rotary optical system comprising a series of lens arranged in ring formation and adapted to be used in conjunction with a continuously moving film caused to travel in a path conforming to the path of travel of the elements of the rotary optical system so that the resulting series of pictures viewed upon the screen will be stationary, each succeeding picture being projected upon the screen through a different element of the rotary optical system. These succeeding pictures will register one upon another so as to produce the effect of animated pictures substantially in the usual manner.

In order to cause the path of the film to conform with the path of travel of the elements of the optical system, it is necessary to cause the film to be oscillated laterally in conformity with the arc shaped path over which the elements of the optical system travel. For this purpose a rotatable member engages directly or indirectly with the edge of the film and may be provided with teeth adapted to engage with notches or sprocket holes therein so as to transmit a continuous lengthwise movement to the film and to cause it to oscillate in a lateral direction to the required extent and at the desired time to agree with the motion of the elements of the optical system through which the picture is being projected. If desired the continuous lengthwise motion of the film may be effected independently of the lateral movement by means of a suitable toothed sprocket or other means in geared connection with the rotary optical system and the means for oscillating the film laterally.

The optical system may comprise a single ring of simple or compound lenses mounted in a suitable disc or carrier adapted to be adjusted axially for focussing purposes. If desired, two or more such rings may be arranged to operate in conjunction with each other.

The centres of the lenses in the optical system are preferably a little less apart than the centres of the teeth upon the rotary member which transmit the motion to the film, and consequently the radius of a ring of lens is slightly less than the radius of these teeth, the difference in the two radii serving to produce the stationary effect in the projected pictures and the amount of this difference varies with the angle of projection. The film is resiliently held either directly or indirectly in engagement with the rotating member which oscillates it in a lateral direction. This may be effected by means of a bar placed at one side of the film and pressed toward it by springs or other suitable means.

A suitable shutter is provided with slots or openings which follow the path of the film so as to mask off the picture being projected and to cut off one picture and permit the projection of the next at regular intervals. Such a shutter may conveniently comprise a rotatable disc in geared connection with the rest of the apparatus and provided with a series of curved slots around its periphery, one end of each of which is nearer to the centre of the shutter than the other. The ends of these slots in the shutter may be brought quite close to each other so that there is no appreciable period between the succeeding pictures, or if desired a space may be left between them equal to the width of a picture so that one picture is completely cut off before the next is projected. A masking window is arranged at any suitable position in the line of projection to cut off any extraneous pictures. This window may be the window of the projecting room. It is also desirable that the area of the source of light should be large enough to avoid unsteadiness in the projected pictures.

When the apparatus is required to produce cinematograph pictures in natural colours from a film carrying recurring groups of component images obtained through the use of suitable colour filters, corresponding colour filters may be provided over each of the apertures in the shutter or may be applied to the elements of the rotary optical system so that each picture will be projected through the correct colour filter to produce a natural coloured picture.

Apparatus for embodying the same principles may be constructed for use both for projecting purposes and for use as a camera for the purpose of obtaining the required negatives for producing the films for projection.

In order that my invention may be more readily understood reference is made to the accompanying sheet of illustrative drawings in which:—

Figure 1 is a side elevation of a suitable apparatus adapted for carrying my invention into practice.

Figure 2 is a rear elevation of the same.

Figure 3 is a front elevation.

Figure 4 is a detail showing a method of moving the film by means of a lantern wheel having pins or teeth adapted to engage in notches in the film edge.

Figure 5 is a part sectional plan of Figure 4.

Figure 6 is an enlarged detail showing the manner in which the lantern wheel teeth engage with the notches in the film edge.

Figures 7, 8 and 9 are respectively part sectional plan, front elevation and side elevation showing a modified method of moving the film by means of teeth upon the face of a rotary member engaging in sprocket holes in the film and Figure 10 is an enlarged sectional detail showing the manner in which the film is held in engagement with these teeth.

Referring to Figures 1, 2 and 3 the film 1 is fed constantly from the upper spool box 2 by means of a toothed sprocket 3 with which it is held in engagement by suitable rollers 4 pressed against its periphery. This toothed sprocket 3 is constantly driven by a suitable chain 5 passing over a toothed sprocket 6 on the spindle 7 upon which the sprocket 3 is mounted. This chain also passes over a toothed wheel 8 upon the spindle 9, provided at one end with a handle 10 by means of which it may be rotated by hand for the purpose of operating the machine. Upon this spindle 9 is also mounted a second toothed sprocket 11 around which the film engages and is held in engagement therewith by the rollers 12 pressed against its periphery. This toothed sprocket 11 serves as a take-up sprocket to feed the film 1 to the take-up spool 13.

Referring now to Figures 4, 5 and 6 in conjunction with Figures 1, 2 and 3 the film passes through a gate 14 located between the top feed sprocket 3 and the bottom take-up sprocket 11. The gate 14 is hinged at 15 upon a fixed guide 16 at one side of the film and provided on its opposite side with a suitable catch 17 for holding it in the closed position. Upon the side of the film opposite from the fixed guide 16 is provided a movable guide 18 resiliently pressed against the edge of the film by the flat springs 19 so as to tend to press the film toward the fixed guide.

A rotary lens carrier 20 is mounted upon a spindle 21 and provided with a series of lens 22 mounted at regular intervals around its periphery. The spindle 21 is adapted to rotate in a bearing 23 on the frame of the machine and this bearing is located so that the lens in one edge of the carrier 20 will be opposite to the pictures in the gate 14. This lens carrier is rotated at the required speed through gearing which will be described hereafter.

The movement of the film to correspond with the movement of the lenses 22 in the lens carrier 20 is obtained by means of a lantern wheel 24 (see Figure 4) mounted upon a spindle 25 adapted to turn in bearings in the frame of the machine and driven through gearing from the main shaft 9 carrying the handle 10. This gearing comprises a large crown wheel 26 mounted upon the spindle 9 and gearing the pinion 27 on the end of the shaft 28. This shaft 28 carries a bevel pinion 29 gearing with a similar bevel pinion 30 upon an inclined shaft 31 which carries at its upper end a small bevel pinion 32 which in turn gears with the large bevel wheel 33 mounted upon the spindle 25 carrying the lantern wheel 24. This causes the lantern wheel 24 to be rotated at the correct speed relatively to the feed sprocket 3 and take-up sprocket 11.

The lantern wheel 24 (shown in detail in Figures 4, 5 and 6) is provided with a narrow slot 34 all round its periphery in which the edge of the film 1 engages. Extending across this slot 34 at regular intervals are a series of pins 35 spaced at the correct distances apart to engage with a series of notches 36 arranged upon the edge of the film 1 and located substantially on the centre line of each picture thereon. As the lantern wheel 24 rotates it will cause the film 1 to be moved in a downward direction by reason of one of the pins 35 engaging in one of the notches 36 in the film. As however these pins 35 travel upon the arc of a circle they will cause the film 1 to be moved edgewise to a corresponding extent against the action of the springs 19 resiliently pressing the movable guide 18 and the film toward the lantern wheel 24. This will cause the film to move in the path corresponding with the path of travel of the lenses 22 in the lens carrier 20 and in such a manner that the resultant picture projected upon a screen will remain substantially stationary in one position.

An aperture 37 is provided in the gate 14 and this aperture 37 is substantially equal in height to the height of two pictures. A rotary shutter 38 is mounted upon the spindle 28 so as to rotate therewith and is of such a size to extend over the aperture 37 in the gate 14. In this shutter 38 are provided three curved slots 39 whose forward ends 40 are close to the periphery of the shutter 38 whilst their tail ends 41 are nearer to its centre to an extent equal to the height of one picture. These curved slots 39 are shaped so that as the shutter rotates the portion of the slot over the aperture 37 in the gate will remain in register with the downwardly moving picture on the film so as to act as a mask therefor. Where the forward end 40 of one slot meets the tail end 41 of the slot in front, a slight gap 42 is formed by sloping the ends of the two slots. When this portion of the shutter passes across the aperture 37 in the gate it will act to cut off the lower picture and expose the upper picture, thus giving a rapid and almost instantaneous change between successive pictures projected upon the screen. In this manner the objectionable flicker, common with ordinary cinematograph machines, and which is so conducive to eye strain, is substantially eliminated.

The method of driving the lens carrier 20 so that it will rotate at the same speed as the lantern wheel 24 consists in providing a toothed wheel 43 mounted upon the lantern wheel 24, so that it will gear with the corresponding toothed wheel 44 upon a lay shaft 45 carried in bearings on the machine. At the opposite end of this lay shaft 45 is fixed a similar toothed wheel 46 which in turn gears with a toothed wheel 47 mounted upon the spindle 21 which supports the lens carrier 20. The lens carrier 20 will thus be rotated in unison with and at the same speed as the lantern wheel 24. In this manner each lens 22 will move in a downward direction at substantially the same speed as the picture on the film 1, and during its downward travel the picture on the film will be correctly masked by the curved slots in the shutter 38. The pin 35 on the lantern wheel 24 which is in engagement with a notch 36 in the side of the film 1 will ensure the film moving at the correct speed and in the required path in agreement with the path of travel of the lenses 22 in the lens carrier 20 with the result that the projected picture will remain substantially stationary on one position on the screen until it is cut off by the tail end 41 of the slot 39 in the shutter 38 to be succeeded by the next picture which will be uncovered by the forward end of the following slot 39.

The movable guide 18 will be pressed by its springs 19 against the edge of the film 1 so as to hold this in close engagement with the pin 35 on the lantern wheel 24, but will give way under the pressure exerted by the pin 35 pressing upon the edge of the film so as to move it in a lateral direction against the resilient pressure of these springs.

In Figures 7, 8, 9 and 10 is illustrated a modified form of wheel for transmitting the correct movement to the film. This wheel comprises a roller 48 provided with a series of pins or teeth 49 projecting from one face thereof. The edge of this disc 48 engages under the edge of the film 1 so that a tooth or pin 49 will project through the ordinary sprocket hole 50 provided in the edge of the film. As the disc 48 rotates each tooth will in turn slip under the edge of the film and engage in the correct sprocket hole. The continued rotation of the disc will cause the pin 49 to impart the correct movement to the film 1 moving it in a downward direction at the correct speed and causing it to slide laterally to the required extent and at the required period to agree with the path of travel of each lens 22 in the lens carrier 20. In order to retain the film in position upon the tooth 49 a wedge shaped shoe 51 is mounted on a resilient arm 52 secured to the frame of the machine and arranged so that the shoe 51 will be pressed toward the face of the disc 48 so that the ends of the tooth 49 will actually contact with and slide over its surface. This will prevent any possibility of the film 1 slipping off the tooth 49 whilst this is actually imparting the required motion to the film. This will be clearly seen by reference to Figure 10, in which the film 1 is shown in section with one of the teeth 49 on the disc 48 projecting through a sprocket hole 50 in the film 1 and engaging against the face of the shoe 51 which thus acts to retain the film in position on the tooth 49. In this case the gate 14 is cut away on its hinged edge at 53 to permit the shoe 51 to engage over the edge of the film. A finger piece 54 may be mounted upon the resilient arm 52 which carries the shoe to enable it to be temporarily held back when placing the film in position in the gate when threading the machine.

The construction of apparatus described in the specification in connection with the drawings is merely an example to show how my method of producing cinematograph pictures may be applied to a projector for showing the pictures upon a screen. The apparatus may be modified in many ways without departing from the nature of the invention and could be suitably adapted for use in a camera for taking negatives by enclosing the parts in a suitable light tight case and making the necessary modifications necessitated by the different purpose to which it is to be applied and which would be understood by any skilled optician conversant with cinematograph cameras.

I claim:

1. In apparatus for the production of cinematograph pictures, a revolving optical system and means for moving the film lengthwise and edgewise so that it follows a path corresponding to the path of the member of the revolving optical system through which a picture is being projected.

2. In apparatus for the production of cinematograph pictures, a revolving optical system, means for moving the film lengthwise and edgewise so that it follows a path corresponding to the path of the member of the revolving optical system through which a picture is being projected, and means for covering and uncovering succeeding pictures in order.

3. In apparatus for the production of cinematograph pictures, a ring of lenses mounted to rotate in their own plane about a common axis, so that each lens will be brought into position to project a picture in turn, and means for moving the film lengthwise and edgewise so that it follows a path corresponding to the path of the lens through which a picture is being projected.

4. In apparatus for the production of cinematograph pictures, a ring of lenses mounted to rotate in their own plane about a common axis so that each lens will be brought into position to project a picture in turn, means for moving the film lengthwise and edgewise so that it follows a path corresponding to the path of the lens through which a picture is being projected, and means for covering and uncovering succeeding pictures in order.

5. In apparatus for the production of cinematograph pictures, a ring of lenses mounted to rotate in their own plane, about a common axis so that each lens will be brought into position to project a picture in turn, a lantern wheel geared to rotate at the same speed as the ring of lenses, notches in the film, and means to resiliently press the film edgewise against the teeth of the lantern wheel, which will act to move it lengthwise and edgewise so that it follows a path corresponding to the path of the lens through which a picture is being projected.

6. In apparatus for the production of cinematograph pictures, a ring of lenses mounted to rotate in their own plane about a common axis so that each lens will be brought into position to project a picture in turn, a lantern wheel geared to rotate at the same speed as the ring of lenses, notches in the film, means to resiliently press the film edgewise against the teeth of the lantern wheel, which will act to move it lengthwise and edgewise so that it follows a path corresponding to the path of the lens through which a picture is being projected, and means for covering and uncovering succeeding pictures in order.

7. In apparatus for the production of cinematograph pictures, a ring of lenses mounted to rotate in their own plane about a common axis so that each lens will be brought into position to project a picture in turn, a roller geared to rotate at the same speed as the ring of lenses, teeth on the roller projecting sideways and adapted to slide over the margin of the film and into and out of perforations therein, means for assisting the engagement and disengagement thereof and means to press the film edgewise against the teeth on the roller which act to move it lengthwise and edgewise so that it follows a path corresponding to the path of the lens through which a picture is being projected.

8. In apparatus for the production of cinematograph pictures, a ring of lenses mounted to rotate in their own plane about a common axis so that each lens will be brought into position to project a picture in turn, a roller geared to rotate at the same speed as the ring of lenses, teeth on the roller projecting sideways and adapted to slide over the margin of the film and into and out of perforations therein, means for assisting the engagement and disengagement thereof, means to press the film edgewise against the teeth on the roller which act to move it lengthwise and edgewise so that it follows a path corresponding to the path of the lens through which a picture is being projected and means for covering and uncovering succeeding pictures in order.

9. In apparatus for the production of cinematograph pictures, a revolving optical system and means for moving the film lengthwise and edgewise so that it follows a path corresponding to the path of the member of the revolving optical system through which a picture is being projected, a rotatable shutter having spirally arranged curved slots to limit the exposure aperture and move with each picture as it is exposed in turn.

10. In apparatus for the production of cinematograph pictures, a ring of lenses mounted to rotate in their own plane about a common axis so that each lens will be brought into position to project a picture in turn, means for moving the film lengthwise and edgewise so that it follows a path corresponding to the path of the lens through which a picture is being projected, and a rotatable shutter having spirally arranged curved slots to limit the exposure aperture and move with each picture as it is exposed in turn.

11. In apparatus for the production of cinematograph pictures, a ring of lenses mounted to rotate in their own plane about a common axis so that each lens will be brought into position to project a picture in turn, a lantern wheel geared to rotate at the same speed as the ring of lenses, notches in the film, means to resiliently press the film edgewise against the teeth of the lantern wheel, which will act to move it lengthwise and edgewise so that it follows a path corresponding to the path of the lens through which a picture is being projected, and a rotatable shutter having spirally arranged curved slots to limit the exposure aperture and move with each picture as it is exposed in turn.

12. In apparatus for the production of cinematograph pictures, a ring of lenses mounted to rotate in their own plane about a common axis so that each lens will be brought into position to project a picture in turn, a roller geared to rotate at the same speed as the ring of lenses, teeth on the roller projecting sideways and adapted to slide over the margin of the film and into and out of perforations therein, means for assisting the engagement and disengagement thereof, means to press the film edgewise against the teeth on the roller which act to move it lengthwise and edgewise so that it follows a path corresponding to the path of the lens through which a picture is being projected, and a rotatable shutter having spirally arranged curved slots to limit the exposure aperture and move with each picture as it is exposed in turn.

13. In apparatus for the production of cinematograph pictures, a revolving optical system, means for moving the film lengthwise and edgewise so that it follows a path corresponding to the path of the member of the revolving optical system through which a picture is being projected, a rotatable shutter having spirally arranged curved slots to limit the exposure aperture and move with each picture as it is exposed in turn, and component colour filters over these slots for the production of polychrome pictures from images in monochrome.

14. In apparatus for the production of cinematograph pictures, a ring of lenses mounted to rotate in their own plane about a common axis so that each lens will be brought into position to project a picture in turn, means for moving the film lengthwise and edgewise so that it follows a path corresponding to the path of the lens through which a picture is being projected, a rotatable shutter having spirally arranged curved slots to limit the exposure aperture and move with each picture as it is exposed in turn, and component colour filters over these slots for the production of polychrome pictures from images in monochrome.

15. In apparatus for the production of cinematograph pictures, a ring of lenses mounted to rotate in their own plane about a common axis so that each lens will be brought into position to project a picture in turn, a lantern wheel geared to rotate at the same speed as the ring of lenses, notches in the film, means to resiliently press the film edgewise against the teeth of the lantern wheel, which will act to move it lengthwise and edgewise so that it follows a path corresponding to the path of the lens through which a picture is being projected, a rotatable shutter having spirally arranged curved slots to limit the exposure aperture and move with each picture as it is exposed in turn, and component colour filters over these slots for the production of polychrome pictures from images in monochrome.

16. In apparatus for the production of cinematograph pictures, a ring of lenses mounted to rotate in their own plane about a common axis so that each lens will be brought into position to project a picture in turn, a roller geared to rotate at the same speed as the ring of lenses, teeth on the roller projecting sideways and adapted to slide over the margin of the film and into and out of perforations therein, means for assisting the engagement and disengagement thereof, means to press the film edgewise against the teeth on the roller which act to move it lengthwise and edgewise so that it follows a path corresponding to the path of the lens through which a picture is being projected, a rotatable shutter having spirally arranged curved slots to limit the exposure aperture and move with each picture as it is exposed in turn, and component colour filters over these slots for the production of polychrome pictures from images in monochrome.

SAMUEL HENRY CROCKER.